(12) United States Patent
Trivisonno et al.

(10) Patent No.: US 11,700,551 B2
(45) Date of Patent: Jul. 11, 2023

(54) APPARATUS FOR SUPPORTING AND INFLUENCING QOS LEVELS

(71) Applicant: HUAWEI TECHNOLOGIES CO., LTD., Guangdong (CN)

(72) Inventors: Riccardo Trivisonno, Munich (DE); Qing Wei, Munich (DE); Mirko Schramm, Berlin (DE); Apostolos Kousaridas, Munich (DE); Emmanouil Pateromichelakis, Munich (DE); Dario Serafino Tonesi, Berlin (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/996,289

(22) Filed: Aug. 18, 2020

(65) Prior Publication Data

US 2020/0383006 A1 Dec. 3, 2020

Related U.S. Application Data

(63) Continuation of application No. PCT/EP2018/054036, filed on Feb. 19, 2018.

(51) Int. Cl.
*H04W 28/24* (2009.01)
*H04W 28/08* (2023.01)
(Continued)

(52) U.S. Cl.
CPC ........... *H04W 28/24* (2013.01); *H04M 15/66* (2013.01); *H04W 24/08* (2013.01);
(Continued)

(58) Field of Classification Search
CPC ............. H04W 24/08; H04W 28/0268; H04W 28/0925; H04W 28/24; H04W 28/0967;
(Continued)

(56) References Cited

U.S. PATENT DOCUMENTS 7,532,613 B1 * 5/2009 Sen ........................ H04W 28/24
370/252
8,842,578 B1 * 9/2014 Zisapel ................... H04L 43/20
370/255
(Continued)

FOREIGN PATENT DOCUMENTS

CN 101370263 A 2/2009
CN 102036316 A 4/2011
(Continued)

OTHER PUBLICATIONS

3GPP TS 25.413 V14.1.0 (Jun. 2017), "3rd Generation Partnership Project; Technical Specification Group Radio Access Network; UTRAN Iu interface Radio Access Network Application Part (RANAP) signalling (Release 14)," Jun. 2017, 455 pages.
(Continued)

*Primary Examiner* — Mehmood B. Khan
(74) *Attorney, Agent, or Firm* — Fish & Richardson P.C.

(57) ABSTRACT

The present disclosure provides methods and apparatuses related to mobile network systems. In an implementation, a method comprises configuring, by an application function (AF) of an apparatus in a mobile network system, a policy control function (PCF) to provide a plurality of Quality of Service (QoS) levels for a session related to an application or a service; and requesting, by the AF, the PCF to configure the plurality of QoS levels, wherein a QoS flow is associated with a plurality of QoS profiles for configuring the plurality of QoS levels in response to the QoS flow being established.

18 Claims, 6 Drawing Sheets

(51) Int. Cl.
  *H04M 15/00* (2006.01)
  *H04W 24/08* (2009.01)
  *H04W 28/02* (2009.01)
(52) U.S. Cl.
  CPC ... *H04W 28/0268* (2013.01); *H04W 28/0925* (2020.05); *H04W 28/0967* (2020.05)
(58) Field of Classification Search
  CPC .............. H04M 15/66; H04L 41/5009; H04L 41/5051; H04L 43/08; H04L 41/0896
  See application file for complete search history.

(56) References Cited

U.S. PATENT DOCUMENTS

| | | | | |
|---|---|---|---|---|
| 9,055,557 | B1* | 6/2015 | Bayar | H04M 15/66 |
| 2009/0279701 | A1* | 11/2009 | Moisand | H04L 12/1886 380/278 |
| 2012/0158928 | A1* | 6/2012 | Naddeo | G06F 11/2028 709/221 |
| 2014/0094208 | A1* | 4/2014 | Egner | H04L 5/006 455/513 |
| 2014/0099967 | A1* | 4/2014 | Egner | H04W 28/26 455/452.2 |
| 2014/0200036 | A1* | 7/2014 | Egner | H04W 64/00 455/456.3 |
| 2014/0344472 | A1 | 11/2014 | Lovsen et al. | |
| 2015/0055608 | A1* | 2/2015 | Egner | H04W 4/025 370/329 |
| 2015/0056960 | A1* | 2/2015 | Egner | H04W 4/027 455/411 |
| 2015/0263957 | A1* | 9/2015 | Wang | H04L 47/20 370/230 |
| 2018/0007586 | A1 | 1/2018 | Wang et al. | |
| 2019/0029057 | A1* | 1/2019 | Pan | H04W 76/10 |
| 2019/0394685 | A1* | 12/2019 | Sharma | H04W 28/24 |
| 2020/0084691 | A1* | 3/2020 | Wallentin | H04W 76/27 |
| 2020/0178112 | A1* | 6/2020 | Youn | H04W 8/02 |
| 2020/0252813 | A1* | 8/2020 | Li | G06Q 20/382 |
| 2022/0151004 | A1* | 5/2022 | Sedlacek | H04W 8/082 |

FOREIGN PATENT DOCUMENTS

| | | | | |
|---|---|---|---|---|
| CN | 105141545 | A | 12/2015 | |
| CN | 105592499 | A | 5/2016 | |
| CN | 106658424 | A | 5/2017 | |
| EP | 2870577 | B1* | 7/2021 | ............. G06Q 30/00 |
| WO | WO-2007097836 | A2* | 8/2007 | ............. H04W 28/24 |
| WO | 2010049002 | A1 | 5/2010 | |
| WO | WO-2010049002 | A1* | 5/2010 | ............. H04L 12/14 |
| WO | WO-2016091298 | A1* | 6/2016 | |
| WO | 2016148399 | A1 | 9/2016 | |
| WO | WO-2016171716 | A1* | 10/2016 | ......... H04W 36/0055 |
| WO | 2017076037 | A1 | 5/2017 | |
| WO | 2017123500 | A1 | 7/2017 | |
| WO | 2017211289 | A1 | 12/2017 | |
| WO | WO-2018075828 | A1* | 4/2018 | ............. H04W 72/02 |
| WO | WO-2018124810 | A1* | 7/2018 | ........ H04W 28/0263 |
| WO | WO-2018145103 | A1* | 8/2018 | ............. H04L 65/80 |
| WO | WO-2019011398 | A1* | 1/2019 | ............. H04W 12/03 |
| WO | WO-2019114939 | A1* | 6/2019 | ........... H04L 12/189 |

OTHER PUBLICATIONS

3GPP TS 22.101 V15.3.0 (Dec. 2017), "3rd Generation Partnership Project; Technical Specification Group Services and System Aspects; Service aspects; Service principles (Release 15)," 102 pages.
3GPP TS 22.186 V15.2.0 (Sep. 2017), "3rd Generation Partnership Project; Technical Specification Group Services and System Aspects; Enhancement of 3GPP support for V2X scenarios; Stage 1(Release 15)," Sep. 2017, 16 pages.
3GPP TS 23.203 V15.0.0 (Sep. 2017), "3rd Generation Partnership Project; Technical Specification Group Services and System Aspects; Policy and charging control architecture (Release 15)," Sep. 2017, 257 pages.
3GPP TS 23.172 V14.0.0 (Mar. 2017), "3rd Generation Partnership Project; Technical Specification Group Core Network and Terminals; Technical realization of Circuit Switched (CS) multimedia serviceUDI/RDI fallback and service modification; Stage 2 (Release 14)," Mar. 2017, 59 pages.
3GPP TS 23.401 V15.1.0 (Sep. 2017), "3rd Generation Partnership Project; Technical Specification Group Services and System Aspects; General Packet Radio Service (GPRS) enhancements for Evolved Universal Terrestrial Radio Access Network (E-UTRAN) access (Release 15)," Sep. 2017, 397 pages.
3GPP TS 23.203 V15.1 0 (Dec. 2017),3rd Generation Partnership Project Technical Specification Group Services and System Aspects;Policy and charging control architecture(Release 15), total 260 pages.
3GPP TS 23.501 V1.5.0 (Nov. 2017), "3rd Generation Partnership Project; Technical Specification Group Services and System Aspects; System Architecture for the 5G System; Stage 2 (Release 15)," Nov. 2017, 170 pages.
3GPP TS 23.501 V15.0.0 (Dec. 2017), "3rd Generation Partnership Project; Technical Specification Group Services and System Aspects; System Architecture for the 5G System; Stage 2( Release 15)," Dec. 2017, 181 pages.
3GPP TS 23.502 V1.3.0 (Nov. 2017), "3rd Generation Partnership Project; Technical Specification Group Services and System Aspects; Procedures for the 5G System; Stage 2 (Release 15)," Nov. 2017, 215 pages.
3GPP TS 23.502 V15.0.0 (Dec. 2017), "3rd Generation Partnership Project; Technical Specification Group Services and System Aspects; Procedures for the 5G System; Stage 2 (Release 15)," Dec. 2017, 257 pages.
3GPP TS 23.503 V0.4.0 (Nov. 2017), "3rd Generation Partnership Project; Technical Specification Group Services and System Aspects; Policy and Charging Control Framework for the 5G System; Stage 2 (Release 15)," Nov. 2017, 53 pages.
3GPP TS 23.503 V15.0.0 (Dec, 2017), "3rd Generation Partnership Project; Technical Specification Group Services and System Aspects; Policy and Charging Control Framework for the 5G System; Stage 2(Release 15)," Dec. 2017, 56 pages.
3GPP TR 23.705 V13.0.0 (Dec. 2014), "3rd Generation Partnership Project; Technical Specification Group Services and System Aspects; Study on system enhancements for user plane congestion management (Release 13)," Dec. 2014, 61 pages.
3GPP TR 23.785 V14.0.0 (Sep. 2016), "3rd Generation Partnership Project; Technical Specification Group Services and System Aspects; Study on architecture enhancements for LTE support of V2X services (Release 14)," Sep. 2016, 52 pages.
3GPP TR 23.786 V0.3.0 (Jan. 2018), "3rd Generation Partnership Project; Technical Specification Group Services and System Aspects; Study on architecture enhancements for EPS and 5G System to support advanced V2X services (Release 16)," Jan. 2018, 19 pages.
Ericsson, "23.503: AF subscription to QoS notification control," SA WG2 Meeting #124, S2-178328, Reno, Nevada USA), Nov. 27, 2017-Dec. 1, 2017, 2 pages.
Ericsson, "23.502: AF subscription to QoS notification control," SA WG2 Meeting #124, S2-178329, Reno, Nevada (USA), Nov. 27, 2017-Dec. 1, 2017, 2 pages.
Huawei et al., "New Key Issue: eV2X QoS Support," SA WG2 Meeting #125, S2-180145, Gothenburg, SE, Jan. 22-26, 2018, 3 pages.
LG Electronics, "23.502: UE or SMF requested QoS modification," SA WG2 Meeting #118-BIS, S2-170242, Spokane, WA, USA, Jan. 16-20, 2017, 5 pages.
PCT International Search Report and Written Opinion issued in International Application No. PCT/EP2018/054036 dated Jul. 20, 2018, 13 pages.
3GPP TS 23.501 V1.3.0 (Sep. 2017), "3rd Generation Partnership Project; Technical Specification Group Services and System Aspects; System Architecture for the 5G System; Stage 2 (Release 15)," Sep. 2017, 174 pages.

(56) References Cited

OTHER PUBLICATIONS

3GPP TS 29.513 V0.3.0 (Jan. 2018), "3rd Generation Partnership Project; Technical Specification Group Core Network and Terminals; 5G System; Policy and Charging Control signalling flows and QoS parameter mapping; Stage 3 (Release 15)," Jan. 2018, 20 pages.
Kim et al., "3GPP SA2 architecture and functions for 5G mobile communication system," Computer Science, Engineering, ICT Express, Apr. 13, 2017, 8 pages.
Office Action issued in Chinese Application No. 201880089954.0 dated Mar. 22, 2021, 7 pages.
Yanxia et al., "5G Core Network Key Technologies and Service Support," Telecommunications Technology . 2017, 8 pages (machine translation).

\* cited by examiner

APPARATUS FOR SUPPORTING AND INFLUENCING QOS LEVELS

CROSS-REFERENCE TO RELATED APPLICATIONS

This application is a continuation of International Application No. PCT/EP2018/054036, filed on Feb. 19, 2018, which is hereby incorporated by reference in its entirety.

TECHNICAL FIELD

The present disclosure relates to an apparatus for a mobile network system, in particular for a 4G system or a 5G system. The apparatus is configured to support multiple Quality of Service (QoS) levels for a session related to an application or service, and is configured to influence and monitor the QoS level for the session. The present disclosure relates also to a method for a mobile network system, in particular a method of configuring the multiple QoS levels of the session for the application or service.

BACKGROUND

For many applications or services offered in a mobile network system, it is crucial that a certain QoS level is provided. For instance, since most Vehicle-To-Everything (V2X) applications and services relate either to driving safety features (e.g. assisted driving) or to aided driving features (e.g. tele operated driving), safety implications are of paramount importance in both cases. For this reason, a tight monitoring and control of QoS needs to be provided from an V2X Application Function (AF), in order to make sure that the QoS expected by the V2X application or service is actually provided. In case that the expected QoS cannot be provided, the V2X application or service should at least be timely informed on the actual provided QoS.

3GPP systems up to Release 15 provide some mechanisms for QoS information exchange with AFs. However, the QoS information made available at the AF, as well as the capability of the AF to influence the QoS, are quite limited. In particular, the 5G system (5GS) as per 3GPP Release 15 specifications, as well as earlier generation communication systems (e.g. 4G, LTE/EPC, UMTS), do not allow the AFs to monitor and/or influence end to end QoS on a per session basis in cases when the negotiated per session QoS cannot be provided.

Moreover, in Release 15, the QoS model of 3GPP 5GS is based on QoS flows. A QoS flow is the finest granularity of QoS differentiation in a session (e.g. a Protocol Data Unit (PDU) session). A QoS flow ID (QFI) is used to identify a QoS flow in the 5GS. User plane traffic with the same QFI within a PDU Session receives the same traffic forwarding treatment. A QoS flow is conventionally characterized by a single QoS profile provided to an Access Network (AN), one or more QoS rule(s) provided a User Equipment (UE), and one or more Service Data Flow (SDF) templates provided to the User Plane Function (UPF). However, if the QoS profile of a QoS flow cannot be satisfied by the 5GS for any reason, a PDU Session Modification may be triggered, and the QoS flow may be released. The outcome of the PDU Session Modification cannot be influenced by the AF (e.g. by a kind of QoS fallback).

Although the 5GS Release 15 specification includes a mechanism for the AF to affect the PCC framework, this ability is rather limited. In particular, the AF can only subscribe in the PCF, in order to get notified when the QoS target for a corresponding application or service cannot be fulfilled during the lifetime of the QoS flow of the session corresponding to the application or service. This allows the AF to make decisions about the corresponding application or service, e.g. terminate it or continue with different characteristics. However, there is no possibility for the AF to influence the QoS that is provided or to control the monitoring of the provided QoS.

SUMMARY

In view of the above-mentioned disadvantages and challenges, the present disclosure aims to improve the current implementations. The present disclosure has an objective to enhance the capabilities of 5GS, in order to support, influence and monitor the QoS for a session related to an application or service. In particular, the present disclosure aims for an apparatus for a mobile network system, which allows the AF to monitor and/or influence end-to-end QoS on a per-session basis. Further, the apparatus should also allow the AF to influence the outcome of a session modification in case the mobile network system is unable to satisfy the required QoS profile.

An objective of the present disclosure is achieved by the solution provided in the enclosed independent claims. Advantageous implementations of the present disclosure are further defined in the dependent claims.

In particular, the present disclosure proposes an apparatus that can use more than one QoS level per session. The disclosure also proposes enhancing the capabilities of the AF in the apparatus with respect to monitoring and/or influencing the QoS levels. The disclosure thus enables the 5GS to operate with multiple QoS levels based on AF input.

A first aspect of the present disclosure provides an apparatus for a mobile network system, in particular a 4G or a 5G system, configured to support multiple QoS levels for a session related to an application or service. An apparatus can be a UE, a RAN, or a core network device.

By supporting the multiple QoS levels, a suitable QoS level for the application or service can be selected. Further, in case of a session modification, because a target QoS level is not anymore possible, at least a well-determined fallback QoS level can be provided, advantageously, instead of terminating the session or downgrading with no control over its QoS level.

In the sense of this document, the term "session" comprises an association between a UE and a Data Network (DN) through a mobile network system that provides connectivity, i.e. the ability to exchange data between the UE and the DN. A session can be a PDU session.

In the sense of this document, the term "application" comprises software entities and/or computer programs installed and executed on the UE and/or on application servers of the DN used to provide services to an end user.

In the sense of this document, the term "service" comprises a combination of actions and/or tasks performed jointly by the UE and/or the DN and/or the mobile network system, and/or applications to supply utilities or to aid an end user, e.g. Remote Driving, Vehicle Platooning, and Assisted Driving etc. A service can be an AF session.

In an implementation form of the first aspect, the session, the application and/or the service are related to a single or multiple slices.

Such network slices are logical end-to-end sub-networks corresponding to, for instance, different verticals. Network slices address the various requirements, for example, from multiple verticals assuming a shared network infrastructure.

By providing network slices, network applications or services can be customized based on the requirements of different use cases, and thus increase the operation efficiency of the mobile network system.

In a further implementation form of the first aspect, the apparatus is configured to switch from a current QoS level for the session to another QoS level for the session in case of a modification of the session, in particular if one or more parameters of the session are modified.

A "parameter" particularly comprises a QoS parameter. With this implementation form, a well-determined QoS level upgrade or downgrade is possible in case of the session modification. The apparatus is accordingly able to influence the outcome of the session modification, and can advantageously avoid terminating the session or downgrading with no control over its QoS level. A parameter can be a parameter of an access node.

In a further implementation form of the first aspect, the apparatus comprises an AF and a PCF, wherein the AF is configured to request from the PCF to configure the multiple QoS levels for the session. Additionally or alternatively, the AF can be configured to request from the PCF to configure the SMF, in particular to adjust one or more parameters to control and/or monitor the QoS for an application. Additionally or alternatively, the AF can be configured to request from the SMF to configure an Access Node, in particular to adjust one or more parameters to control and/or monitor the QoS for an application.

For instance, the AF may indicate multiple (e.g. two or potentially more) QoS levels regarded as suitable to support the related application or service to the PCF, and may also request to be timely notified when the QoS level is changed or when none of the suitable QoS levels can be supported (any longer).

The AF may particularly request the PCF to configure rules to support the different QoS levels for the session. The term "configure" in the above phrase "request from the PCF to configure the multiple QoS levels for the session" comprises that the PCF authorizes the multiple QoS levels (or the rules to support the different QoS levels) for the session. The policy supporting multiple QoS levels for the session may apply to a session relating to subsets of UEs and/or subsets of network slices and/or applications or services.

In a further implementation form of the first aspect, for configuring the multiple QoS levels, if a QoS flow for the session is established, the QoS flow is associated with multiple QoS profiles for implementing the multiple QoS levels, in particular wherein the associating is performed by the PCF and requested by the AF.

In other words, a single QoS flow can support multiple QoS levels. The QoS profiles of the QoS flow can be switched to change the QoS level.

In a further implementation form of the first aspect, for configuring the multiple QoS levels, if a group of QoS flows for the session is established, each QoS flow of the group is associated with one QoS profile for implementing a determined QoS level, in particular the associating is performed by the PCF and requested by the AF.

In other words, a single QoS flow supports a single QoS level. QoS flows related to different QoS profiles can be switched to change the QoS level. In particular, for configuring the multiple QoS levels, the group of QoS flows for the session may be established and bound together. Further, at least one QoS flow of the group may be active to transfer data in compliance with its QoS profile.

In a further implementation form of the first aspect, the apparatus is configured to switch from a current QoS profile of the at least one QoS flow of the session to another QoS profile of the at least one QoS flow of the session in case of a modification of the session, in particular the switching is triggered by at least one of: an AN; a SMF; a UDM; a PCF; a UE; a UPF.

Thus, the session for the application or service can continue, even in case of a session modification that makes the target QoS level impossible, with the new QoS level related to the other QoS profile.

In a further implementation form of the first aspect, the apparatus is configured to switch from a currently active QoS flow of the session associated with a first QoS profile to a currently inactive QoS flow of the session associated with a second QoS profile, in particular in case of a modification of the session; and/or switch from a currently active QoS profile to a currently inactive QoS profile. After the switching, the active QoS flow becomes inactive, and the inactive QoS flow becomes active. The switching may be triggered by at least one of: an AN; a SMF; a UDM; a PCF; a UE. Thus, the session for the application or service can continue, even in case of a session modification that makes the target QoS level impossible, with the new QoS level related to the newly activated QoS flow. The switch can be a consequence of a parameter reaching a predefined value, in particular of one or more predefined QoS flows turning inactive.

An "active QoS flow" in the sense of this document comprises a QoS flow being used to transfer data from the UE to the DN and/or vice versa. An "inactive QoS flow" in the sense of this document comprises a QoS flow not being used to transfer data from the UE to the DN and/or vice versa. An "active QoS profile" in the sense of this document for a multi QoS profile flow comprises a QoS profile, of which the QoS parameters are used to regulate the data transfer for the flow. An "inactive QoS profile" in the sense of this document for a multi QoS profile flow comprises a QoS profile, of which the QoS parameters are not used to regulate the data transfer for the flow.

In a further implementation form of the first aspect, the PCF, in particular the PCC rule in the PCF, is configured to support different QoS levels, in particular configuring PCC rules in the PCF enabling different QoS profiles for QoS flows relating to the service, and in particular with a preferred QoS level downgrade in case that a target QoS level cannot be fulfilled for the session. This configuration can be preconfigured and/or configured by the AF.

In the sense of this application, the configuration can also be a request to the PCF from the AF. That is, the configuration, by the PCF upon request of the AF, of the multiple QoS levels can include configuring a preferred QoS level downgrades, in order to take place when the target QoS level for a service cannot be fulfilled (anymore) during the lifetime of the corresponding QoS flow(s). Thus, the session for the application or service can be downgraded, and needs not be terminated after the session modification and does not have to be continued with an uncontrolled lower level of QoS.

A "target QoS level" in the sense of this document for a multi QoS level session can be the QoS level which the mobile network system shall attempt to uphold at the session establishment.

In a further implementation form of the first aspect, the preferred QoS level downgrade includes a set of QoS downgrade rules, in particular one QoS downgrade rule for each QoS flow of the session.

This allows the AF to instruct the PCF exactly how to treat each QoS flow in case of a session modification that impacts this QoS flow.

In a further implementation form of the first aspect, the preferred QoS level downgrade includes a QoS downgrade mode that determines whether the QoS downgrade rules of the set are to be applied independently or jointly to the QoS flows of the session.

This allows the AF to instruct the PCF on exactly how to handle the QoS level downgrading in case of a session modification that impacts at least one flow, and can flexibly be adapted, for instance, depending on the type of application or service.

In a further implementation form of the first aspect, the PCF is configured to provide a QoS level service operation, and the AF is configured to invoke the QoS level service operation in order to subsequently configure the PCF with the multiple QoS levels.

A "service operation" in the sense of this document comprises a primitive (i.e. a unidirectional signaling message sent by a Network Function (NF) to another NF) of a NF service provided by a NF. The service operation allows the NF, particularly the AF, to invoke the QoS influencing capability only if needed.

In a further implementation form of the first aspect, the AF is configured to configure the PCF to provide multiple QoS levels by a point-to-point interface.

In a further implementation form of the first aspect, the AF is configured to provide the PCF with a network identifier, ID, and/or a network slice ID, and/or an AF service ID, and/or a UE ID to indicate for which network, and/or network slice, and/or AF service, and/or UE the multiple QoS levels sessions shall apply.

Thereby, the AF can configure the multiple QoS levels in a flexible manner as needed.

In a further implementation form of the first aspect, the apparatus, in particular the PCF, and/or any other NF, and/or an AN of the apparatus, is configured to notify the AF of an intended and/or completed modification of the session, in particular the notification comprises information on the QoS level change.

This notification can be sent at any time, in particular before the session modification is completed. The apparatus is thus provided with a QoS monitoring capability. Whenever the conditions for a session modification occur, e.g. the AF may be notified immediately of the session modification initiation, either directly by the NFs, at which such conditions are detected, or indirectly via the PCF.

In a further implementation form of the first aspect, the AF is configured to configure the PCF, and/or other NF, and/or AN with at least one QoS monitoring parameter, and the PCF, and/or other NF, and/or AN is configured to notify the AF of the intended and/or completed modification of the session according to the at least one QoS monitoring parameter.

Thus, the AF has the freedom to configure the QoS monitoring capability as needed.

In a further implementation form of the first aspect, the at least one QoS monitoring parameter includes a QoS monitoring timing that determines whether the PCF, and/or other NF, and/or AN is to notify the AF of an intended modification of the session, or of a completed modification of the session, or of both.

In a further implementation form of the first aspect, the at least one QoS monitoring parameter includes a QoS monitoring mode that determines whether the PCF, and/or other NF, and/or AN is to notify the AF directly of the intended and/or completed modification of the session, or whether the other NF and/or AN is to notify the AF indirectly via the PCF of the intended and/or completed modification of the session.

A second aspect of the present disclosure provides a method for a mobile network system, in particular a 4G or a 5G system, comprising configuring, by an AF in the mobile network system, a PCF in the mobile network system with multiple QoS levels for a session related to an application or service.

In an implementation form of the second aspect, the session, the application and/or the service are related to a single slice or multiple slices.

In a further implementation form of the second aspect, the method comprises switching from a current QoS level for the session to another QoS level for the session in case of a modification of the session, in particular if one or more parameters of the session are modified.

In a further implementation form of the second aspect, for configuring the multiple QoS levels, if a QoS flow for the session is established, the QoS flow is associated with multiple QoS profiles for implementing the multiple QoS levels, in particular the associating is performed by the PCF and requested by the AF.

In a further implementation form of the second aspect, for configuring the multiple QoS levels, if a group of QoS flows for the session is established, each QoS flow of the group is associated with one QoS profile for implementing a determined QoS level, in particular the associating is performed by the PCF and requested by the AF.

In a further implementation form of the second aspect, the method comprises switching from a current QoS profile of the at least one QoS flow of the session to another QoS profile of the at least one QoS flow of the session in case of a modification of the session, in particular the switching is triggered by at least one of: an AN; a SMF; a UDM; a PCF; a UE.

In a further implementation form of the second aspect, the method comprises switching from a currently active QoS flow of the session associated with a first QoS profile to a currently inactive QoS flow of the session associated with a second QoS profile in case of a modification of the session; and/or switch from a currently active QoS profile to a currently inactive QoS profile.

In particular, the switching is triggered by at least one of: an AN; a SMF; a UDM; a PCF; a UE.

In a further implementation form of the second aspect, the method comprises configuring, by the AF, the PCF with a preferred QoS level downgrade in case a target QoS level cannot be fulfilled for the session.

In a further implementation form of the second aspect, the preferred QoS level downgrade includes a set of QoS downgrade rules, in particular one QoS downgrade rule for each QoS flow of the session.

In a further implementation form of the second aspect, the preferred QoS level downgrade includes a QoS downgrade mode that determines whether the QoS downgrade rules of the set are to be applied independently or jointly to the QoS flows of the session.

In a further implementation form of the second aspect, the PCF provides a QoS level service operation, and the AF invokes the QoS level service operation in order to subsequently configure the PCF with the multiple QoS levels.

In a further implementation form of the second aspect, the AF configures the PCF to provide multiple QoS levels by a point-to-point interface.

In a further implementation form of the second aspect, the AF provides the PCF with a network identifier, ID, and/or a network slice ID, and/or an AF service ID, and/or a UE ID to indicate for which network, and/or network slice, and/or AF service, and/or UE the multiple QoS level sessions shall apply.

In a further implementation form of the second aspect, the method, in particular implemented by the PCF, and/or any other NF, and/or an AN, comprises notifying the AF of an intended and/or completed modification of the session, in particular the notification comprises information on the QoS level change.

In a further implementation form of the second aspect, the AF configures the PCF, and/or other NF, and/or AN with at least one QoS monitoring parameter, and the PCF, and/or other NF, and/or AN notifies the AF of the intended and/or completed modification of the session according to the at least one QoS monitoring parameter.

In a further implementation form of the second aspect, the at least one QoS monitoring parameter includes a QoS monitoring timing that determines whether the PCF, and/or other NF, and/or AN is to notify the AF of an intended modification of the session, or of a completed modification of the session, or of both.

In a further implementation form of the second aspect, the at least one QoS monitoring parameter includes a QoS monitoring mode that determines whether the PCF, or other NF, and/or AN is to notify the AF directly of the intended and/or completed modification of the session, or whether the other NF and/or AN is to notify the AF indirectly via the PCF of the intended and/or completed modification of the session.

The method of the second aspect and its implementation forms achieve the same advantages and effects as described above for the apparatus of the first aspect and its respective implementation forms.

Overall, the apparatus and method of the present disclosure significantly improve the 5GS, as explained as follows. Compared to previous generation mobile network systems, 5GS are expected to extend their application to vertical industries (by network slicing), notable examples being V2X communication, Industrial Automation and Smart Cities. To facilitate the integration of the requirements of vertical industries, and to ease the customization of 5GS behaviors accordingly, extended capabilities of third party AFs are therefore introduced in 3GPP Release 15 specifications. This may be achieved by leveraging on the 5GC Service Based Interface (SBI) feature. The apparatus and method according to the first and second aspect of the present disclosure enhance the third party AF with a QoS influencing and QoS monitoring capability. The apparatus and method are especially advantageous to the V2X use case, where a tighter interaction between AFs and 5GS is envisioned as being highly beneficial.

It has to be noted that all devices, elements, units and means described in the present application could be implemented in the software or hardware elements or any kind of combination thereof. All steps which are performed by the various entities described in the present application as well as the functionalities described to be performed by the various entities are intended to mean that the respective entity is adapted to or configured to perform the respective steps and functionalities. Even if, in the following description of specific embodiments, a specific functionality or step to be performed by external entities is not reflected in the description of a specific detailed element of that entity which performs that specific step or functionality, it should be clear for a skilled person that these methods and functionalities can be implemented in respective software or hardware elements, or any kind of combination thereof.

BRIEF DESCRIPTION OF DRAWINGS

The above described aspects and implementation forms of the present disclosure will be explained in the following description of specific embodiments in relation to the enclosed drawings, in which.

DETAILED DESCRIPTION OF EMBODIMENTS

Figure 1:
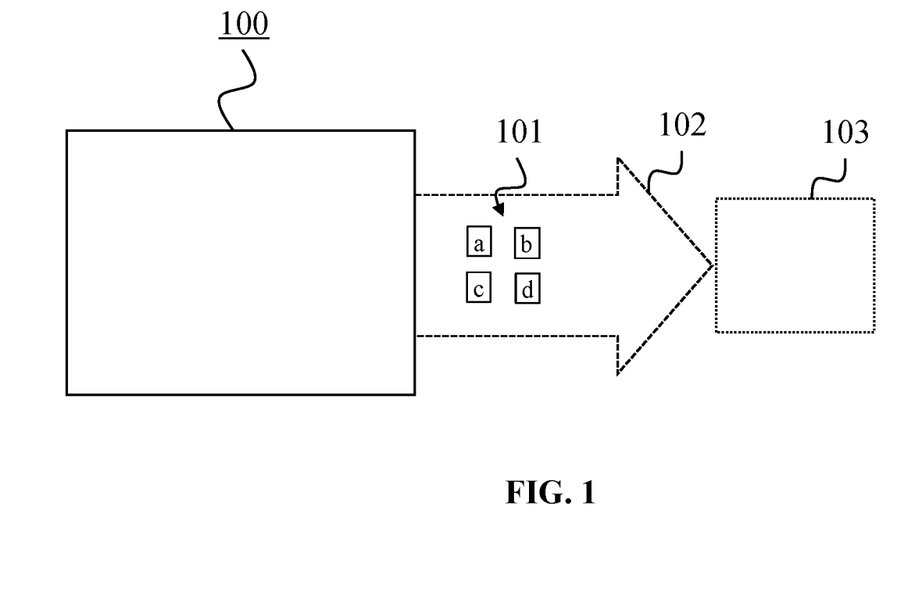
FIG. 1 shows an apparatus according to an embodiment of the present disclosure.

FIG. 1 shows an apparatus 100 for a mobile network system according to an embodiment of the present disclosure, in particular for a 4G system or a 5G system. The apparatus 100 is configured to support multiple QoS levels 101 for a session 102 related to an application 103 or service. The different QoS levels 101 are here exemplarily labelled with a, b, c and d, respectively. The fact that the apparatus 100 supports these multiple QoS levels 101 means preferably that the apparatus 100 is able to switch from one (current) QoS level 101 for the session 102 to another QoS level 101 for the session 102, especially in case of a modification of the session 102. This advantageously allows the apparatus 100 to continue the application 103 and or service with a different QoS level 101 than before the session modification, and may avoid a termination of the session 102, and thus the application 103 or service.

Figure 2:
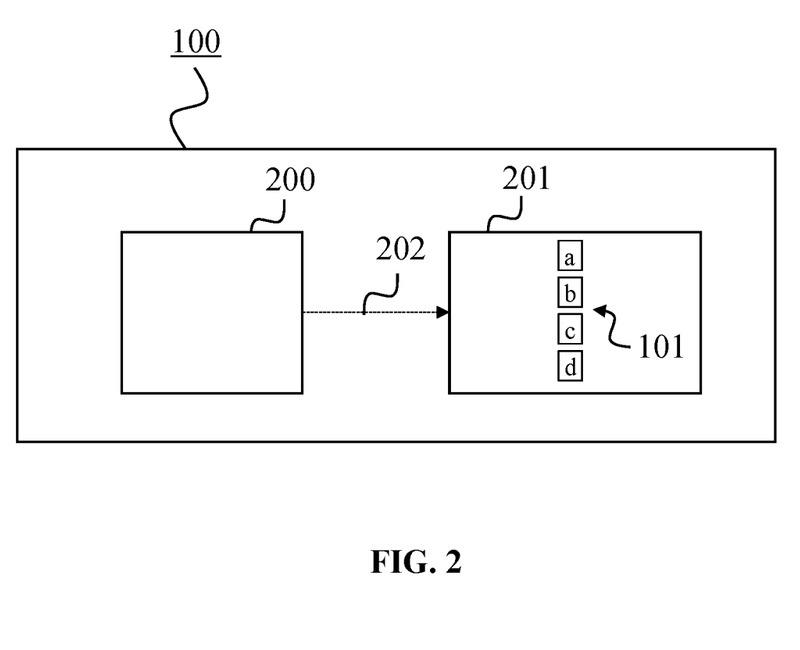
FIG. 2 shows an apparatus according to an embodiment of the present disclosure.

FIG. 2 shows an apparatus 100 according to an embodiment of the present disclosure, which builds on the apparatus 100 shown in FIG. 1. Accordingly, also the apparatus 100 shown in FIG. 2 supports multiple QoS levels 101 for a session 102. Same elements in FIG. 1 and FIG. 2 are accordingly labelled with the same reference signs and function likewise.

The apparatus 100 shown in FIG. 2 includes, in particular, an AF 200 and a PCF 201. The AF 200 is configured to request (e.g. by a request message 202) from the PCF 201 to configure the multiple QoS levels 101 for the session 102. This advantageously provides the AF 200 with a QoS influencing capability. The AF 200 may also be provided with a QoS monitoring capability. To this end, the PCF 201, and/or any other NF, and/or an AN of the apparatus 100 is preferably configured (e.g. by request of the AF 200) to notify the AF 200 of an intended and/or completed modification of the session 102.

Figure 3:
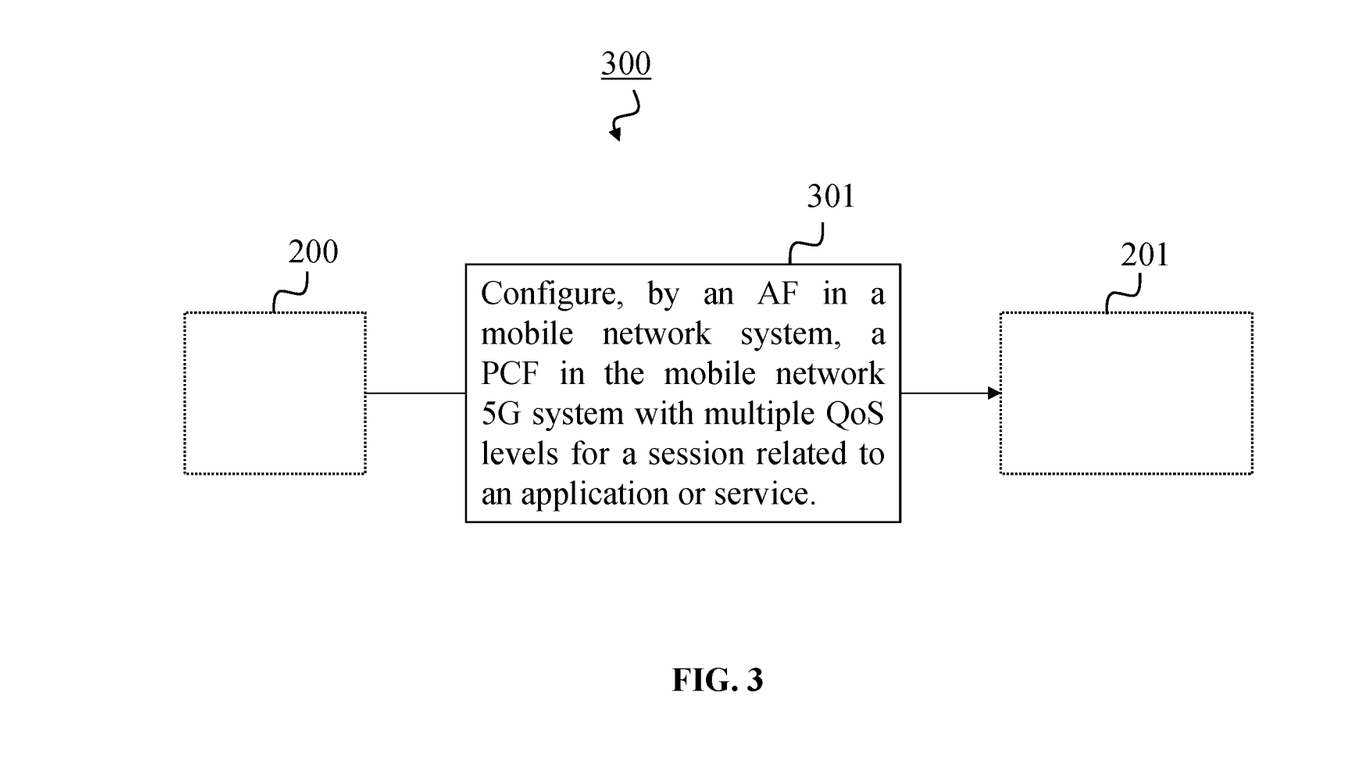
FIG. 3 shows a method according to an embodiment of the present disclosure.

FIG. 3 shows a method 300 according to an embodiment of the present disclosure for a mobile network system, particularly for a 4G system or 5G system. The method 300 may be carried out by the apparatus 100 shown in FIG. 1 or in FIG. 2. In particular, the method 300 includes a step 301 of configuring, by an AF 200 in the mobile network system or in the apparatus 100, a PCF 201 in the mobile network system or in the apparatus 100 with multiple QoS levels 101 for a session 102 related to an application 103 or service.

The QoS influencing capability and the QoS monitoring capability of the AF 200 may have to be activated. For instance, the PCF 201 of the apparatus 100 shown in FIG. 2 may be configured to provide a QoS level service operation, and the AF 200 may be configured to invoke this QoS level service operation, in order to subsequently request 202 the PCF 201 to configure the multiple QoS levels 101. Likewise, the AF 200 may also invoke the QoS level service operation, in order to request that it is subsequently notified of any intended and/or completed modification of the session 102.

The activations of these new QoS capabilities are now described in more detail. The AF 200 can specifically activate the QoS influencing capability by invoking an "Npcf_QoS_Influence_Request/Response" service operation provided by the PCF 201. This service operation allows the AF 200 to configure the PCF 201 by preferably indicating one or more of:
- DNN and/or Network Slice identifiers (S-NSSAIs) and/or AF-Service-Identifiers for which the QoS influencing capability (i.e. the multiple QoS levels 101) shall apply.
- UE(s) identifiers, for which the QoS influencing capability (i.e. the multiple QoS levels 101) shall apply.
- A multiple QoS level mode of operation. Two different QoS level modes of operation are illustrated with respect to FIG. 4. In particular, FIGS. 4(A) and (B) show different sessions 102 for an application 103 or service both supporting multiple QoS levels 101.

Figure 4:
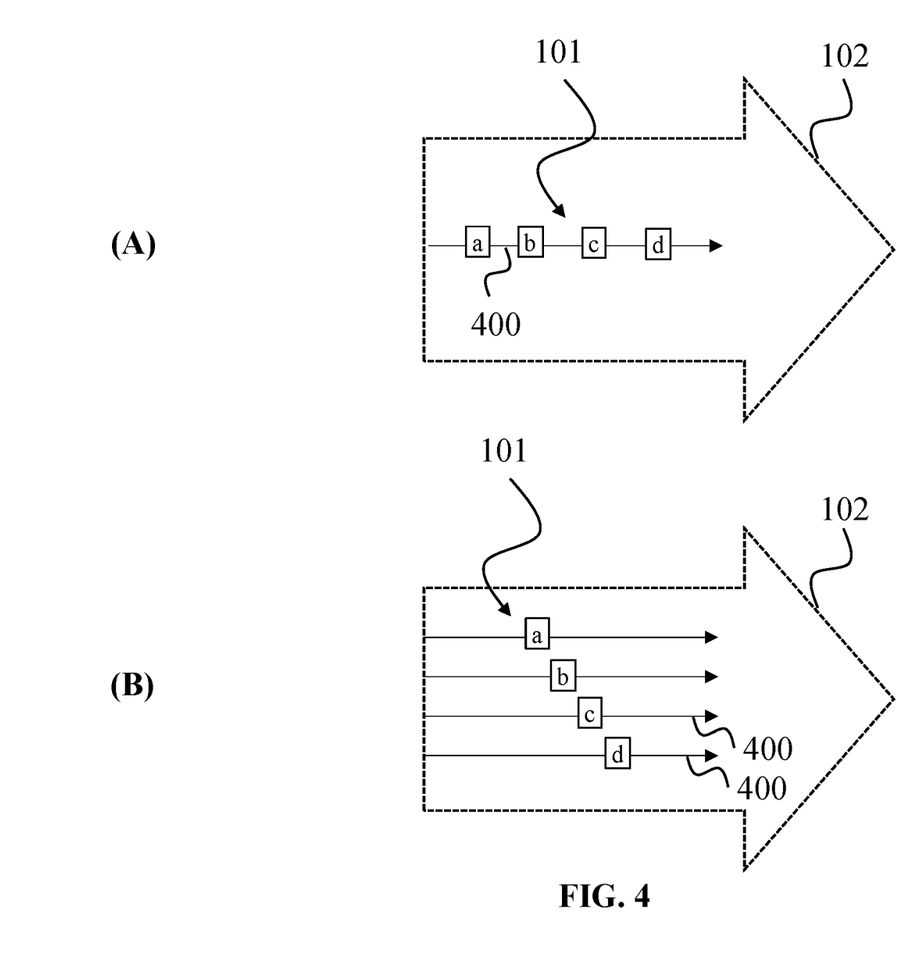
FIG. 4 shows in (A) and (B) sessions for an application or service in an apparatus according to an embodiment of the present disclosure.

The first QoS level operation mode illustrated with respect to FIG. 4(A) is a "Multi-QoS-Profile Flow Mode". In this mode of operation, the session 102 supports the multiple QoS levels 101 through multi-QoS-profile flows 400. A QoS flow 400 of the session 102 shown in FIG. 4(A) is associated with multiple QoS profiles for implementing the multiple QoS levels 101 (indicated as a, b, c and d, respectively). In particular, each of multiple QoS flows 400 of the session 102 could be associated with multiple QoS profiles, and the QoS profile of a QoS flow 400 may change according to network conditions (e.g. network load, radio link capacity etc.) and/or in case of a session modification.

The second QoS operation mode illustrated with respect to FIG. 4(B) is a "Multi-Flow Session Mode". In this mode of operation, the session 102 supports the multiple QoS levels 101 through multiple single-QoS-profile flows 400. A group of QoS flows 400 is established for the session 102, and each QoS flow 400 of the group is associated with one (different) QoS profile for implementing a determined QoS level 101 (the different QoS levels 101 are again indicated as a, b, c and d, respectively).
- The set of QoS profiles associated to a QoS flow 400 in case of the "Multi-QoS-Profile Flow Mode" or the group of QoS flows 400 and the corresponding QoS profile per QoS flow 400 in case of the "Multi-Flow Session Mode".

Further, the AF 200 can specifically activate the QoS monitoring capability by invoking an "Nxxx_QoS_Monitoring_Request/Response" service operation (wherein "xxx" can be AN, AMF, SMF, UDM, PCF), provided by the AN, AMF, SMF, UDM and/or PCF. The QoS monitoring capability can be activated on each single NF (i.e. AN, AMF, SMF, UDM and/or PCF). The service operations allow the AF 200 to configure the AN, AMF, SMF, UDM, and/or PCF 201 by indicating one or more of:
- DNN and/or Network Slice identifiers (S-NSSAIs) and/or AF-Service-Identifiers for which the QoS monitoring capability shall apply (i.e. the notification of the AF 200 of an intended and/or completed modification of the session 102, in particular comprising information on the QoS level 101 change).
- UE(s) identifiers for which the QoS monitoring capability shall apply (i.e. the notification of the AF 200 of an intended and/or completed modification of the session 102, in particular comprising information on the QoS level 101 change).
- A QoS monitoring timing (e.g. early, late or both, as described below in more detail with respect to the operation of the QoS monitoring capability). The QoS monitoring timing is a QoS monitoring parameter.
- A QoS monitoring mode (e.g. direct or indirect, as described below in more detail with respect to the operation of the QoS monitoring capability). The QoS monitoring mode is a QoS monitoring parameter.

The operations of the new QoS capabilities are now described in more detail. After the QoS influencing capability has been activated, the PCF 201 is configured to support a multi-QoS-level session 102 as indicated in the Npcf_QoS_Influence_Request.
- The session 102 relating to DNN and/or Network Slice identifiers (S-NSSAIs) and/or AF-Service-Identifiers and/or UE(s) indicated by the Nxxx_QoS_Influence_Request shall support the multiple QoS levels 101 as indicated in the Nxxx_QoS_Influence_Request.
- In case of the "Multi-QoS-Profile Flow Mode" (see FIG. 4(A)), whenever a session modification occurs, the at least one QoS flow 400 of the session 102 can switch its QoS profile according to the multiple QoS levels 101 indicated in the Nxxx_QoS_Influence_Request. In other words, the apparatus 100 can switch from a current QoS profile of the at least one QoS flow 400 of the session 102 to another QoS profile of the at least one QoS flow 400 of the session 102 in case of the modification of the session 102.
- In case of the "Multi-Flow Session Mode" (see FIG. 4(B)), for each requested QoS flow 400 as indicated in the Nxxx_QoS_Influence_Request, the group of QoS flows 400 is established at session establishment. Radio Resource reservation is preferably applied only to the requested QoS flow 400. In case of a session modification, if the modification relates to the active QoS flow 400, no radio resource reservation is kept for the active QoS flow 400, and resource reservation is applied to another inactive QoS flow 400 of the group. In other words, the apparatus 100 can switch from a currently active QoS flow 400 of the session 102 associated with a first QoS profile to a currently inactive QoS flow 400 of the session 102 associated with a second QoS profile in case of a modification of the session 102, and/or switch from a currently active QoS profile to a currently inactive QoS profile.

After the QoS monitoring capability has been activated on any NF supporting it (AN, AMF, SMF, UDM, PCF 201), the NF shall notify the AF 200 on QoS changes relating to the session 102 as indicated in the Nxxx_QoS_Monitoring_Request.
- The NF shall notify any QoS changes for PDU Session 102 relating to DNN and/or Network Slice identifiers (S-NSSAIs) and/or AF-Service-Identifiers and/or UE(s) indicated by the Nxxx_QoS_Monitoring_Request.

If the QoS monitoring timing in the Nxxx_QoS_Monitoring_Request is set to "early", the NF shall notify the AF 200 on the occurrence of conditions for a session modification.

If the QoS monitoring timing in the Nxxx_QoS_Monitoring_Request is set to "late", the NF shall notify the AF 200 on the completion of the session modification following the occurrence of conditions for a session modification.

If the QoS monitoring timing in the Nxxx_QoS_Monitoring_Request is set to "both", the NF shall notify the AF 200 on the occurrence of conditions for a session modification and on the completion of the session modification following the occurrence of conditions for a session modification.

For AN, AMF, SMF, UDF and PCF 201, if the QoS monitoring mode in the Nxxx_QoS_Monitoring_Request is set to "direct", the NF shall notify the AF 200 of the QoS change directly via the Nxxx_EventExposure_Notify service operation.

For AN, AMF, SMF and UDF, if the QoS monitoring mode in the Nxxx_QoS_Monitoring_Request is set to "indirect", the NF shall notify the PCF 201 of the QoS change via the Nxxx_EventExposure_Notify service operation, and the PCF 201 shall notify indirectly the AF of the QoS change directly via the Npcf_EventExposure_Notify service operation.

In the following, an exemplary and simplified implementation of the solution of the present disclosure is now illustrated. The implementation is in particular conceived as an incremental enhancement of 5GS. The implementation allows the AF 200 of the apparatus 100 according to an embodiment of the present disclosure (e.g. as in FIG. 1 or FIG. 2) the following:

To configure the PCF 201 on the preferred QoS level downgrades (preferably per QoS flow 400) to take place when the target QoS for an application 103 or service cannot be fulfilled during the lifetime of the corresponding QoS flow(s) 400 via the Npcf_QoS_Influence_Request message. The Npcf_QoS_Influence_Request message includes the preferred QoS level downgrades for QoS attributes and values, e.g. 5QI (per flow), ARP (per flow), RQA (per flow), GFBR (UL and DL) (per flow), MFBR (UL/DL) (per flow), Session-AMBR (per PDU Session 102).

Whenever the conditions for a session (here, PDU session 102) modification occur, to be notified of the PDU Session Modification initiation either directly by the NFs at which such conditions are detected (the NF can be either AMF, or UDM, of SMF, or AN) via the Nxxx_EventExposure_Notify message (xxx can be AN, AMF, UDM, SMF), or indirectly via PCF Npcf_EventExposure_Notify message after the PCF 201 has been involved in the PDU Session Modification.

Figure 5:
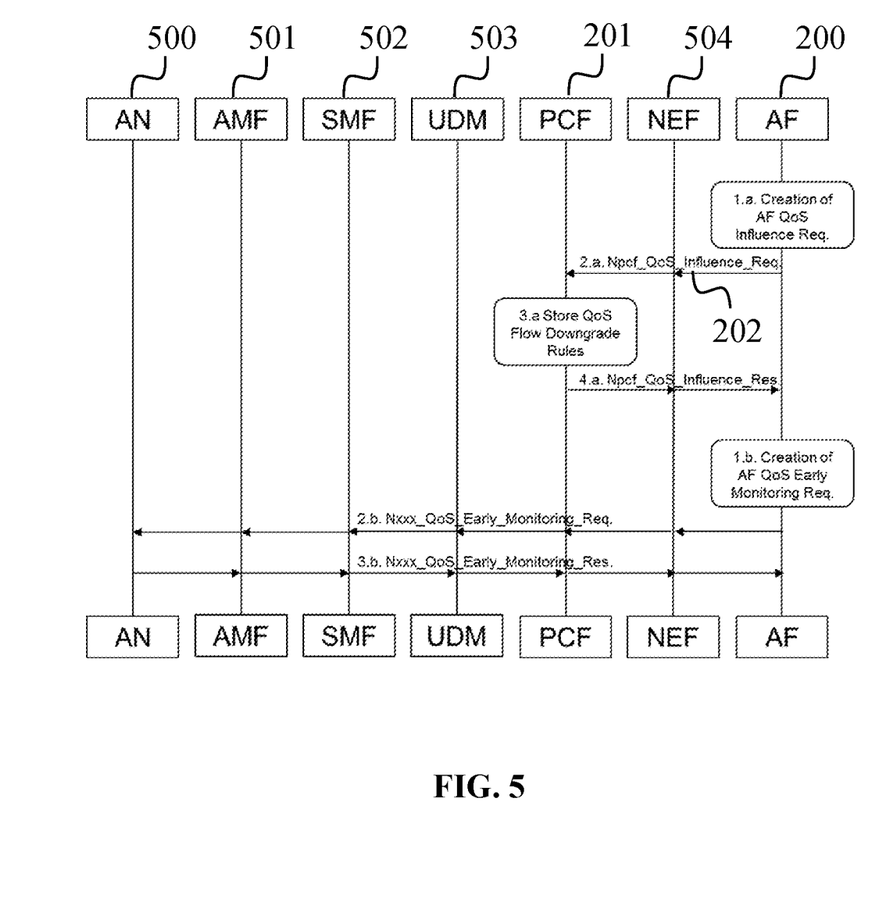
FIG. 5 shows an AF Request/Response procedure for activating QoS monitoring and QoS influencing capabilities.

FIG. 5 illustrates for this exemplary implementation an AF Request/Response procedure for activating the QoS monitoring capability and the QoS influencing capability, respectively.

Step 1.a: The AF 200 invokes an Npcf_QoS_Influence_Request service operation. The request contains:
Either a DNN and possibly slicing information (S-NSSAI) or an AF-Service-Identifier;
Information of the UE(s) whose QoS needs to be influenced;
A preferred QoS level downgrade configuration message (message details shown later).

Step 2.a: The AF 200 sends its request to the PCF 201 directly or via the Network Exposure Function (NEF) 504.

Step 3.a: The PCF 201 stores the preferred QoS level downgrade rules for DNN, S-NSSAI, AF-Service-Identifier, and UE(s).

Step 4.a: The PCF 201 invokes Npcf_QoS_Influence_Response service operation.

Step 1.b: The AF 200 invokes an Npcf_QoS_Monitoring_Request service operation. The request contains:
Either a DNN and possibly slicing information (S-NSSAI) or an AF-Service-Identifier;
Information of the UE(s) whose QoS needs to be monitored;
The list of triggers for PDU Session Modification to be early monitored.
The PDU Session Modification triggers notification mode (QoS monitoring mode), i.e. direct notification or indirect notification.

Step 2.b: The AF 200 sends its request 202 to at least one of the following NFs: AN 500, AMF 501, SMF 502, UDM 503, PCF 201 (depending on the list of triggers for PDU Session Modification to be early monitored) directly or via the NEF 504.

Step 3.b: At least one of the following NFs: AN 500, AMF 501, SMF 502, UDM 503, PCF 201 (depending on the list of triggers for PDU Session Modification to be early monitored) invokes the Nxxx_QoS_Monitoring_Response service operation.

Figure 6:
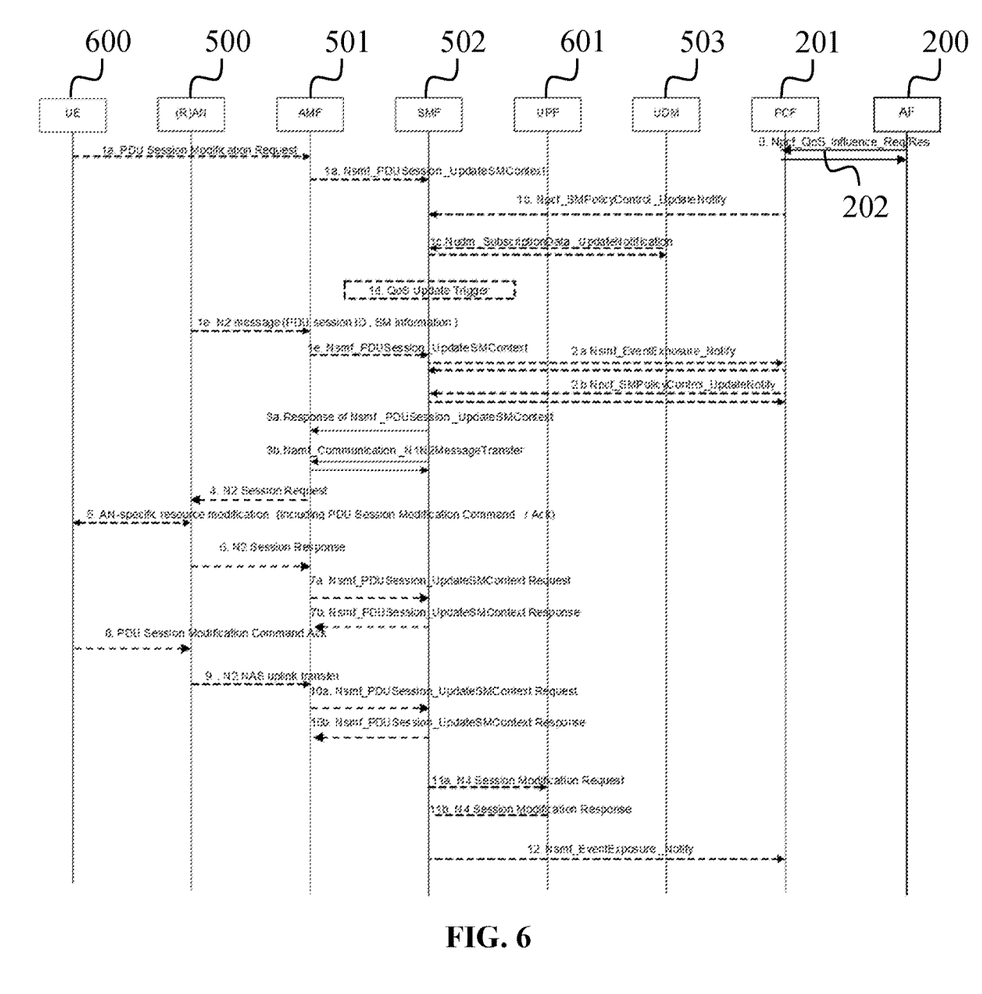
FIG. 6 shows the impact of the QoS influencing capability on a PDU Session Modification.

FIG. 6 shows the PDU Session Modification procedure as per TS23.502, highlighting in step 0 the activation of the QoS influencing capability, by which the AF 200 is able to request, in request 202, the PCF 201 to configure the different QoS levels 101 and, preferably, the preferred QoS level downgrade(s). The PDU Session Modification procedure will be influenced according to a Preferred QoS Downgrade Configuration message received by the PCF 201. This Preferred QoS Downgrade Configuration message includes preferably:
A "QoS Downgrade Mode parameter".
A "QoS Downgrade Rules table".
The QoS Downgrade Mode parameter indicates how the QoS downgrade rules shall apply in case of multiple flow PDU Sessions 102. The QoS Downgrade Mode can be set to one of:
"per flow independent"
"intertwined flows"

If the QoS Downgrade Mode parameter is set to "per flow independent", the QoS downgrade rules apply independently on each QoS flow 400 according to the QoS Downgrade Rules table. In other words, the preferred QoS level downgrade is attempted QoS flow 400 by QoS flow 400, independently, according to the QoS Downgrade Rules table.

If the QoS Downgrade Mode parameter is set to "intertwined flows", the QoS level downgrade rules apply jointly on all QoS flows 400 according to the QoS Downgrade Rules table. In other words, the preferred QoS level downgrade is attempted considering jointly all QoS flows 400 of the PDU Session 102, according to the QoS Downgrade Rules table and the relative values of other QoS parameters, including e.g., Priority Level, Packet Delay Budget, Packet Error Rate, Default Averaging Window, ARP.

An exemplary QoS Downgrade Rules table is shown below and indicates the preferred QoS downgrade rule per QoS flow 400. In particular, for each 5QI value, the table indicates the preferred fallback 5QI. Per each GBR 5QI value, the table indicates also the preferred GBR scaling factor (i.e. the preferred GBR value reduction after the PDU Session Modification completes).

| Current Flow 5QI | Preferred Fallback 5QI | GBR Scaling Factor |
|---|---|---|
| 1 | PD1 | SF1 |
| 2 | PD2 | SF2 |
| 3 | PD3 | SF3 |
| 4 | PD4 | SF4 |
| 65 | PD65 | SF65 |
| 66 | PD66 | SF66 |
| 75 | PD75 | SF75 |
| 5 | PD5 | n.a. |
| 6 | PD6 | n.a. |
| 7 | PD7 | n.a. |
| 8 | PD8 | n.a. |
| 9 | PD9 | n.a. |
| 69 | PD69 | n.a. |
| 70 | PD70 | n.a. |
| 79 | PD79 | n.a. |

The present disclosure has been described in conjunction with various embodiments as examples as well as implementations. However, other variations can be understood and effected by those persons skilled in the art and practicing the claimed invention, from the studies of the drawings, this disclosure and the independent claims. In the claims as well as in the description, the word "comprising" does not exclude other elements or steps and the indefinite article "a" or "an" does not exclude a plurality. A single element or other unit may fulfill the functions of several entities or items recited in the claims. The mere fact that certain measures are recited in the mutual different dependent claims does not indicate that a combination of these measures cannot be used in an advantageous implementation.

The invention claimed is:

1. A method comprising:
configuring, by an application function (AF) in a mobile network system, a policy control function (PCF) to provide a plurality of Quality of Service (QoS) levels for a session related to an application or a service;
sending, by the AF, a request signal to the PCF, wherein the request signal comprises a request to the PCF to associate a QoS flow having a QoS flow identifier (QFI) with a plurality of QoS profiles for configuring the plurality of QoS levels, and the request signal comprises the plurality of QoS levels; and
wherein the request signal instructs the PCF to switch from a current QoS profile of the plurality of QoS profiles to another QoS profile of the plurality of QoS profiles in response to a modification of one or more parameters of a PDU session.

2. The method according to claim 1, further comprising:
requesting the PCF to configure a session management function (SMF); and
requesting the SMF to configure an access node.

3. The method according to claim 1, wherein at least one of the session, the application, or the service is related to one or more network slices.

4. The method according to claim 1, further comprising:
switching from an active QoS flow associated with a first QoS profile to an inactive QoS flow associated with a second QoS profile.

5. The method according to claim 1, wherein the PCF is configured to associate, in response to a request by the AF, the QoS flow with the plurality of QoS profiles.

6. The method according to claim 5, wherein a policy and charging control (PCC) rule in the PCF is configured by the AF to enable the plurality of QoS profiles for a plurality of QoS flows relating to the service, and a QoS level is downgraded when a target QoS level cannot be fulfilled for the session.

7. The method according to claim 6, wherein the QoS level is downgraded based on a plurality of QoS downgrade rules corresponding to the plurality of QoS flows of the session.

8. The method according to claim 7, wherein the QoS level is downgraded based on a QoS downgrade mode indicative of whether the plurality of QoS downgrade rules are to be applied independently or jointly to the plurality of QoS flows.

9. The method according to claim 1, wherein the PCF is configured to provide a QoS level service operation, and the AF is configured to invoke the QoS level service operation to subsequently configure the PCF with the plurality of QoS levels.

10. The method according to claim 9, wherein configuring the PCF to provide the plurality of QoS levels further comprises:
configuring, by the AF, the PCF to provide the plurality of QoS levels by a point-to-point interface.

11. The method according to claim 9, further comprising:
providing, by the AF, the PCF with at least one of a network identifier, a network slice identifier, an AF service identifier, or a user equipment (UE) identifier to indicate at least one of a network, a network slice, an AF service, or a UE that a plurality of QoS level sessions are to be applied to.

12. The method according to claim 11, further comprising:
sending, by at least one of the PCF, a network function (NF), or the AN, a notification to notify the AF at least one of an intended modification or a completed modification of the session, wherein the notification comprises information of a QoS level change.

13. The method according to claim 12, further comprising:
configuring, by the AF, the at least one of the PCF, the NF, or the AN with at least one QoS monitoring parameter, wherein the AF is notified based on the at least one QoS monitoring parameter.

14. The method according to claim 13, wherein the at least one QoS monitoring parameter includes a QoS monitoring timing indicative of whether the at least one of the PCF, the NF, or the AN is to notify the AF of the at least one of the intended modification or the completed modification of the session.

15. The method according to claim 13, wherein the at least one QoS monitoring parameter includes a QoS monitoring mode indicative of whether the AF is to be directly or indirectly notified via the PCF.

16. A method comprising:
configuring, by an application function (AF) of in a mobile network system, a policy control function (PCF) to provide a plurality of Quality of Service (QoS) levels for a session related to an application or a service;
sending, by the AF, a request signal to the PCF, wherein the request signal comprises a request to the PCF to associate each of a plurality of QoS flows having a QoS flow identifier (QFI) with a QoS profile for configuring the plurality of QoS levels, and the request signal comprises the plurality of QoS levels; and
wherein the request signal instructs the PCF to switch from a current QoS profile of the plurality of QoS profiles to another QoS profile of the plurality of QoS profiles in response to a modification of one or more parameters of a PDU session.

17. The method according to claim 16, wherein the PCF is configured to associate, in response to a request by the AF, each of the plurality of QoS flows with a QoS profile.

18. An application function (AF) in a mobile network system, comprising:
- at least one processor; and
- one or more memories coupled to the at least one processor and storing programming instructions for execution by the at least one processor, wherein the programming instructions instruct the at least one processor to perform operations comprising:
  - causing the application function (AF) to configure a policy control function (PCF) to provide a plurality of Quality of Service (QoS) levels for a session related to an application or a service;
  - causing the AF to send a request signal to the PCF, wherein the request signal comprises a request to the PCF to associate a QoS flow having a QoS flow identifier (QFI) with a plurality of QoS profiles for configuring the plurality of QoS levels, and the request signal comprises the plurality of QoS levels; and
  - wherein the request signal instructs the PCF to switch from a current QoS profile of the plurality of QoS profiles to another QoS profile of the plurality of QoS profiles in response to a modification of one or more parameters of a PDU session.

* * * * *

UNITED STATES PATENT AND TRADEMARK OFFICE
CERTIFICATE OF CORRECTION

PATENT NO. : 11,700,551 B2
APPLICATION NO. : 16/996289
DATED : July 11, 2023
INVENTOR(S) : Riccardo Trivisonno et al.

It is certified that error appears in the above-identified patent and that said Letters Patent is hereby corrected as shown below:

In the Claims

In Column 14, In Line 54, In Claim 16, after "(AF)" delete "of".

Signed and Sealed this
Seventeenth Day of October, 2023

Katherine Kelly Vidal
*Director of the United States Patent and Trademark Office*